(12) United States Patent
Chang et al.

(10) Patent No.: US 9,724,895 B2
(45) Date of Patent: Aug. 8, 2017

(54) COMPOSITE LAMINATE WITH REINFORCEMENT OF METAL MESH

(71) Applicant: Advanced Materials Technology Innovation Company, Taoyuan (TW)

(72) Inventors: Yeou Shin Chang, Hsinchu (TW); Diing Guey Hwang, Taoyuan (TW)

(73) Assignee: STRONGMAN PRODUCTS CORP., Tainan (TW)

( * ) Notice: Subject to any disclaimer, the term of this patent is extended or adjusted under 35 U.S.C. 154(b) by 186 days.

(21) Appl. No.: 14/620,040

(22) Filed: Feb. 11, 2015

(65) Prior Publication Data

US 2016/0229153 A1    Aug. 11, 2016

(51) Int. Cl.

| | |
|---|---|
| *B32B 15/02* | (2006.01) |
| *B32B 5/12* | (2006.01) |
| *B32B 5/26* | (2006.01) |
| *B32B 15/14* | (2006.01) |
| *B32B 5/00* | (2006.01) |
| *B32B 15/00* | (2006.01) |

(52) U.S. Cl.
CPC ............... *B32B 15/02* (2013.01); *B32B 5/00* (2013.01); *B32B 5/12* (2013.01); *B32B 5/26* (2013.01); *B32B 15/00* (2013.01); *B32B 15/14* (2013.01); *B32B 2262/103* (2013.01)

(58) Field of Classification Search
CPC ....................................................... B32B 15/02
USPC ........................................................... 428/113
See application file for complete search history.

(56) References Cited

U.S. PATENT DOCUMENTS

| | | | |
|---|---|---|---|
| 6,641,893 B1 * | 11/2003 | Suresh | C03C 14/00 428/105 |
| 2009/0053458 A1 * | 2/2009 | Birrell | B62D 25/105 428/68 |

* cited by examiner

*Primary Examiner* — Brent O'Hern
(74) *Attorney, Agent, or Firm* — Ming Chow; Sinorica, LLC

(57) ABSTRACT

A composite laminate includes two composite layers, at least one metal mesh of high strength and high capability of absorbing impact energy, and multiple unidirectional fibrous layers, wherein the metal mesh and the unidirectional fibrous layers are disposed between the two composite layers. By adding the metal mesh to a composite laminate for making parts, such as front forks, frames, and seat posts of bicycles, an interlocking structure can be formed in the composite laminate. Due to the metal mesh having high strength and toughness, a part being formed of the composite laminate will have a high strength and an enhanced impact resisting capacity and thus can be prevented from brittle fracture. Furthermore, with the metal-reinforced composite laminate, a failure of the part can be warned at an earlier time, so that the part can be prevented from catastrophic damages, thus ensuring safety for users.

18 Claims, 6 Drawing Sheets

COMPOSITE LAMINATE WITH REINFORCEMENT OF METAL MESH

TECHNICAL FIELD OF THE INVENTION

The present invention relates to a composite laminate and, more particularly, to a composite laminate that is added with a metal mesh.

DESCRIPTION OF THE PRIOR ART

Due to brittle fracture of conventional composite materials (such as carbon fabrics or glass fabrics), mechanical parts formed of conventional composite materials may encounter a catastrophic failure upon an impact force. As an example, when the front wheel of a bicycle is subject to a violent impact, if the steering tube is made of a conventional carbon fiber reinforced material, an instant fracture may occur at the portion of the tube near the crown of the front fork, the front wheel will immediately move away from the bicycle and thus the rider may have a fatal risk.

In view of the disadvantages of conventional composite materials, there is a need to develop a composite material that has an enhanced impact resisting capacity, so that a part formed of the composite material can be protected from brittle fracture.

SUMMARY OF THE INVENTION

One object of the present invention is to provide a composite laminate, which is added with a metal mesh of high strength and toughness to increase the strength and impact resisting capacity, so that the composite laminate can be protected from brittle fracture.

To achieve the above object, the composite laminate may comprise a first composite layer, a second composite layer, a metal mesh, an upper stack of multiple unidirectional fibrous layers, and a lower stack of multiple unidirectional fibrous layers.

The metal mesh, the upper stack of unidirectional fibrous layers, the lower stack of unidirectional fibrous layers are disposed between the first composite layer and the second composite layer. The unidirectional fibrous layers in ether stack can be aligned at the same direction or different directions. A unidirectional fibrous layer of the upper stack and a corresponding unidirectional fibrous layer of the lower stack can be aligned at the same direction.

The first composite layer, the second composite layer, the unidirectional fibrous layers can be made by using glass fabrics, carbon fabrics, mats, or unidirectional prepregs of carbon fibers.

In one embodiment, the upper stack includes a first unidirectional fibrous layer, a second unidirectional fibrous layer, and a third unidirectional layer; the lower stack includes a fourth unidirectional fibrous layer, a fifth unidirectional fibrous layer, and a sixth unidirectional layer. The first composite layer is bonded to the third unidirectional fibrous layer which is in turn bonded to the second unidirectional fibrous layer which is in turn bonded to the first unidirectional fibrous layer which is in turn bounded to a top surface of the metal mesh; the second composite layer is bonded to the sixth unidirectional fibrous layer which is in turn bonded to the fifth unidirectional fibrous layer which is in turn bonded to the fourth unidirectional fibrous layer which is in turn bonded to a bottom surface of the metal mesh. The fibers of the first unidirectional fibrous layer and the fibers of the fourth unidirectional fibrous layer are aligned at the same direction. The fibers of the second unidirectional fibrous layer and the fibers of the third unidirectional fibrous layer are aligned at different directions such that the fiber direction of the second unidirectional fibrous layer and the fiber direction of the third unidirectional fibrous layer are symmetrical about the fiber direction of the first unidirectional fibrous layer. The fibers of the fifth unidirectional fibrous layer and the fibers of the sixth unidirectional fibrous layer are aligned at different directions such that the fiber direction of the fifth unidirectional fibrous layer and the fiber direction of the sixth unidirectional fibrous layer are symmetrical about the fiber direction of the fourth unidirectional fibrous layer.

In another embodiment, the upper stack includes a first unidirectional fibrous layer, a second unidirectional fibrous layer, a third unidirectional layer, a seventh unidirectional fibrous layer, and an eighth unidirectional fibrous layer; the lower stack includes a fourth unidirectional fibrous layer, a fifth unidirectional fibrous layer, a sixth unidirectional layer, a ninth unidirectional fibrous layer, and a tenth unidirectional fibrous layer. The first composite layer is bonded to the eighth unidirectional fibrous layer which is in turn bonded to the seventh unidirectional fibrous layer which is in turn bonded to the third unidirectional fibrous layer which is in turn bonded to the second unidirectional fibrous layer which is in turn bonded to the first unidirectional fibrous layer which is in turn bonded to a top surface of the metal sheet. The second composite layer is bonded to the tenth unidirectional fibrous layer which is in turn bonded to the ninth unidirectional fibrous layer which is in turn bonded to the sixth unidirectional fibrous layer which is in turn bonded to the fifth unidirectional fibrous layer which is in turn bonded to the fourth unidirectional fibrous layer which is in turn bonded to a bottom surface of the metal sheet.

In a further embodiment, the composite laminate may comprise a first composite layer, a second composite layer, a first metal mesh, a second metal mesh, an upper stack of multiple unidirectional fibrous layers, and a lower stack of multiple unidirectional fibrous layers. The upper stack includes a first unidirectional fibrous layer, a second unidirectional fibrous layer, a third unidirectional layer, a seventh unidirectional fibrous layer, and an eighth unidirectional fibrous layer. The lower stack includes a fourth unidirectional fibrous layer, a fifth unidirectional fibrous layer, a sixth unidirectional layer, a ninth unidirectional fibrous layer, and a tenth unidirectional fibrous layer. The first composite layer is bonded to the eighth unidirectional fibrous layer which is in turn bonded to the seventh unidirectional fibrous layer which is in turn bonded to the first metal mesh which is in turn bonded to the third unidirectional fibrous layer which is in turn bonded to the second unidirectional fibrous layer which is in turn bonded to the first unidirectional fibrous layer. The second composite layer is bonded to the tenth unidirectional fibrous layer which is in turn bonded to the ninth unidirectional fibrous layer which is in turn bonded to the second metal mesh which is in turn bonded to the sixth unidirectional fibrous layer which is in turn bonded to the fifth unidirectional fibrous layer which is in turn bonded to the fourth unidirectional fibrous layer. The fibers of the first unidirectional fibrous layer and the fibers of the fourth unidirectional fibrous layer are aligned at the same direction. The fibers of the second unidirectional fibrous layer and the fibers of the third unidirectional fibrous layer are aligned at different directions such that the fiber direction of the second unidirectional fibrous layer and the fiber direction of the third unidirectional fibrous layer are symmetrical about the fiber direction of the first unidirectional fibrous layer. The fibers of the fifth unidirectional fibrous layer and the fibers of the sixth unidirectional fibrous layer are aligned at different directions such that the fiber direction of the fifth unidirectional fibrous layer and the fiber direction of the sixth unidirectional fibrous layer are symmetrical about the fiber direction of the fourth unidirectional fibrous layer. The fibers of the seventh unidirectional fibrous layer and the fibers of the eighth unidirectional fibrous layer are aligned at different directions such that the fiber direction of the seven unidirectional fibrous layer and the fiber direction of the eighth unidirectional fibrous layer are symmetrical about the fiber direction of the first unidirectional fibrous layer. The fibers of the ninth unidirectional fibrous layer and the fibers of the tenth unidirectional fibrous layer are aligned at different directions such that the fiber direction of the ninth unidirectional fibrous layer and the fiber direction of the tenth unidirectional fibrous layer are symmetrical about the fiber direction of the fourth unidirectional fibrous layer.

By adding a metal mesh with high strength and high capability of absorbing impact energy to a composite laminate (for making parts, such as front forks, frames, and seat posts of bicycles), an interlocking structure can be formed in the composite laminate. Due to the metal mesh having high strength and toughness, a part being formed of the composite laminate will have a high strength and an enhanced impact resisting capacity and thus can be prevented from brittle fracture. Furthermore, with the metal-reinforced composite laminate, a failure of the part can be warned at an earlier time, so that the part can be prevented from catastrophic damages, thus ensuring safety for users.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
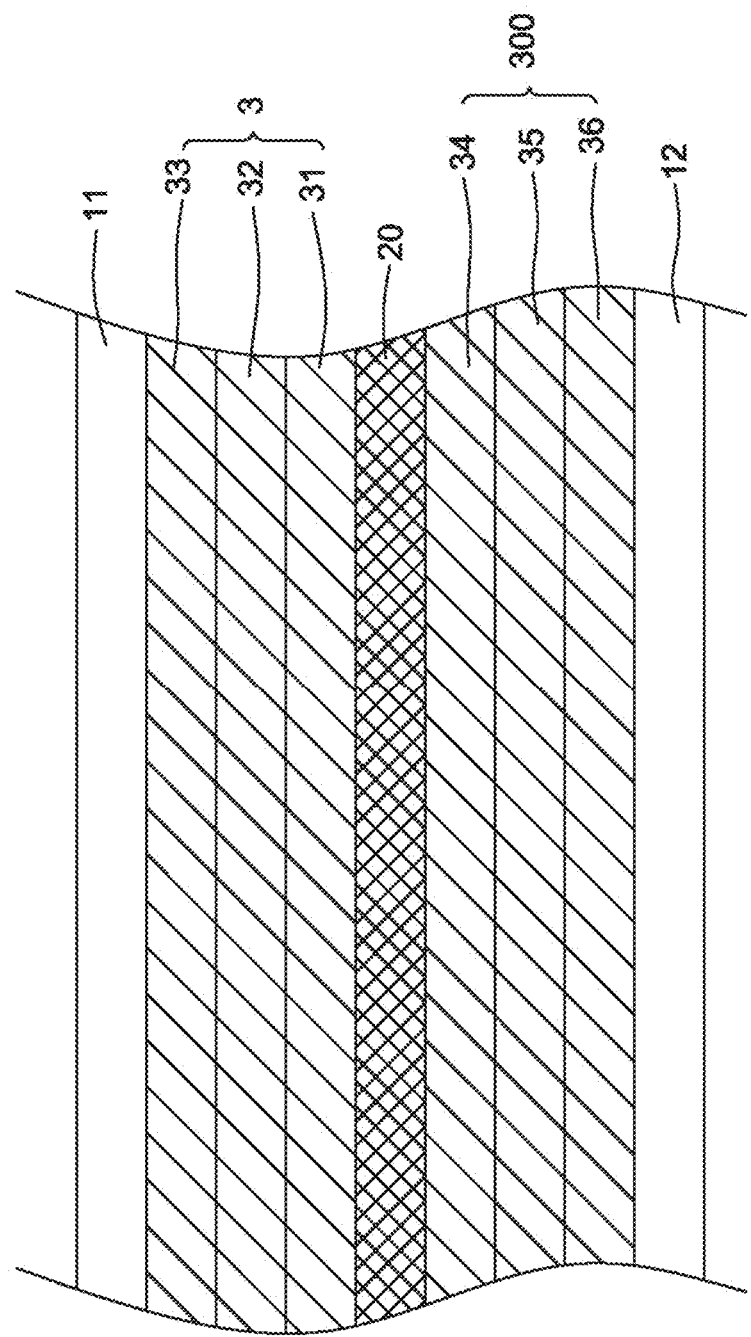
FIG. 1 shows a schematic sectional view of a composite laminate according to a first embodiment of the present invention.

Referring to FIG. 1, a composite laminate according to a first embodiment of the present invention is shown, which generally comprises a first composite layer 11, a second composite layer 12, a metal mesh 20, an upper stack 3 of multiple unidirectional fibrous layers, and a lower stack 300 of multiple unidirectional fibrous layers. As shown, the metal sheet 20, the upper stack 3, and the lower stack 300 are disposed between the first composite layer 11 and the second composite layer 12.

More specifically, the metal mesh 20 is disposed between the upper stack 3 and the lower stack 300; the first composite layer 11 is disposed on an outer surface of the upper stack 3 distal from the metal mesh 20; the second composite layer 12 is disposed on an outer surface of the lower stack 300 distal from the metal mesh 20.

Preferably, the first composite layer 11 and the second composite layer 12 can be formed by using glass fabrics, carbon fabrics, or mats. The unidirectional fibrous layers in the upper stack 3 and the lower stack 300 can be formed by using unidirectional prepregs of carbon fibers. The composite laminate can be used to manufacture various parts, such as frame and front fork of bicycle, that meet the strength, weight distribution, and rigidity required for an application More specifically, the upper stack 3 includes a first unidirectional fibrous layer 31, a second unidirectional fibrous layer 32, and a third unidirectional layer 33; the lower stack 300 includes a fourth unidirectional fibrous layer 34, a fifth unidirectional fibrous layer 35, and a sixth unidirectional layer 36.

In this embodiment, the unidirectional fibrous layers 31, 32, 33, 34, 35 and 36 can be aligned at the same direction or different directions. Particularly, a fibrous layer of the upper stack 3 and a corresponding fibrous layer of the lower stack 300 can be aligned at the same direction; namely, the first unidirectional fibrous layer 31 and the fourth unidirectional fibrous layer 34 can be aligned at the same direction, the second unidirectional fibrous layer 32 and the fifth unidirectional fibrous layer 35 can be aligned at the same direction, the third unidirectional fibrous layer 33 and the sixth unidirectional fibrous layer 36 can be aligned at the same direction.

As shown in FIG. 1, the first composite layer 11 is bonded to the third unidirectional fibrous layer 33 which is in turn bonded to the second unidirectional fibrous layer 32 which is in turn bonded to the first unidirectional fibrous layer 31 which is in turn bounded to a top surface of the metal mesh 20; the second composite layer 12 is bonded to the sixth unidirectional fibrous layer 36 which is in turn bonded to the fifth unidirectional fibrous layer 35 which is in turn bonded to the fourth unidirectional fibrous layer 34 which is in turn bonded to a bottom surface of the metal mesh 20. A bonding between two adjacent layers of the composite laminate (including the bonding between the metal mesh and an adjacent fibrous layer) can be achieved by an adhesive resin.

More specifically, the fibers of the first unidirectional fibrous layer 31 and the fibers of the fourth unidirectional fibrous layer 34 are aligned at the same direction, for example, they can be aligned along a longitudinal direction of the composite laminate, which can be referred to as a direction of zero degree. The fibers of the second unidirectional fibrous layer 32 and the fibers of the third unidirectional fibrous layer 33 are aligned at different directions such that the fiber direction of the second unidirectional fibrous layer 32 and the fiber direction of the third unidirectional fibrous layer 33 are symmetrical about the fiber direction of the first unidirectional fibrous layer 31. The fibers of the fifth unidirectional fibrous layer 35 and the fibers of the sixth unidirectional fibrous layer 36 are aligned at different directions such that the fiber direction of the fifth unidirectional fibrous layer 35 and the fiber direction of the sixth unidirectional fibrous layer 36 are symmetrical about the fiber direction of the fourth unidirectional fibrous layer 34.

By adding the metal mesh 20 with high strength and capability of absorbing impact energy to the unidirectional fibrous layers of the composite laminate, interlocking structures between the metal mesh 20 and the adjacent fibrous layers can be formed. Due to the high strength and toughness of the metal mesh 20 within the composite laminate, the strength and the impact resistance of the composite laminate can be increased significantly, so that the composite laminate can be prevented from brittle fracture. Thus, a part being formed of the metal reinforced composite laminate will have an enhanced strength and impact resistance. Furthermore, a failure of the part can be warned at an earlier time, so that the part can be prevented from catastrophic damages, so that the safety of users can be guaranteed.

Figure 2:
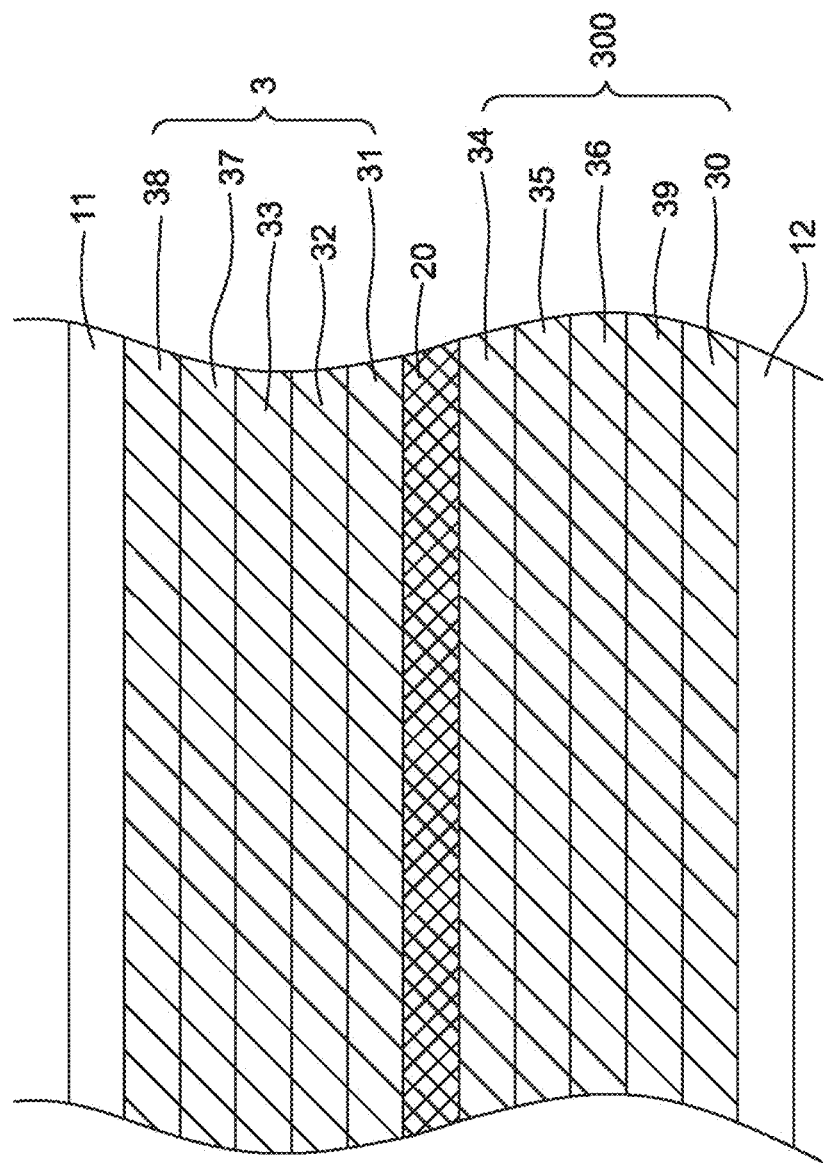
FIG. 2 shows a schematic sectional view of a composite laminate according to a second embodiment of the present invention.

Referring to FIG. 2, a composite laminate according to a second embodiment of the present invention is shown, which generally comprises a first composite layer 11, a second composite layer 12, a metal mesh 20, an upper stack 3 of multiple unidirectional fibrous layers, and a lower stack 300 of multiple unidirectional fibrous layers. The upper stack 3 includes a first unidirectional fibrous layer 31, a second unidirectional fibrous layer 32, a third unidirectional layer 33, a seventh unidirectional fibrous layer 37, and an eighth unidirectional fibrous layer 38. The lower stack 300 includes a fourth unidirectional fibrous layer 34, a fifth unidirectional fibrous layer 35, a sixth unidirectional layer 36, a ninth unidirectional fibrous layer 39, and a tenth unidirectional fibrous layer 30.

As shown in FIG. 2, the first composite layer 31 is bonded to the eighth unidirectional fibrous layer 38 which is in turn bonded to the seventh unidirectional fibrous layer 37 which is in turn bonded to the third unidirectional fibrous layer 33 which is in turn bonded to the second unidirectional fibrous layer 32 which is in turn bonded to the first unidirectional fibrous layer 31 which is in turn bonded to a top surface of the metal sheet 20. The second composite layer 12 is bonded to the tenth unidirectional fibrous layer 30 which is in turn bonded to the ninth unidirectional fibrous layer 39 which is in turn bonded to the sixth unidirectional fibrous layer 36 which is in turn bonded to the fifth unidirectional fibrous layer 35 which is in turn bonded to the fourth unidirectional fibrous layer 34 which is in turn bonded to a bottom surface of the metal sheet 20. A bonding between two adjacent layers of the composite laminate (including the bonding between the metal mesh and an adjacent fibrous layer) can be achieved by an adhesive resin. More specifically, the fibers of the first unidirectional fibrous layer 31 and the fibers of the fourth unidirectional fibrous layer 34 are aligned at the same direction, for example, they can be aligned along a longitudinal direction of the composite laminate, which can be referred to as a direction of zero degree. The fibers of the second unidirectional fibrous layer 32 and the fibers of the third unidirectional fibrous layer 33 are aligned at different directions such that the fiber direction of the second unidirectional fibrous layer 32 and the fiber direction of the third unidirectional fibrous layer 33 are symmetrical about the fiber direction of the first unidirectional fibrous layer 31. The fibers of the fifth unidirectional fibrous layer 35 and the fibers of the sixth unidirectional fibrous layer 36 are aligned at different directions such that the fiber direction of the fifth unidirectional fibrous layer 35 and the fiber direction of the sixth unidirectional fibrous layer 36 are symmetrical about the fiber direction of the fourth unidirectional fibrous layer 34. The fibers of the seventh unidirectional fibrous layer 37 and the fibers of the eighth unidirectional fibrous layer 38 are aligned at different directions such that the fiber direction of the seven unidirectional fibrous layer 37 and the fiber direction of the eighth unidirectional fibrous layer 38 are symmetrical about the fiber direction of the firth unidirectional fibrous layer 34. The fibers of the ninth unidirectional fibrous layer 39 and the fibers of the tenth unidirectional fibrous layer 30 are aligned at different directions such that the fiber direction of the ninth unidirectional fibrous layer 39 and the fiber direction of the tenth unidirectional fibrous layer 30 are symmetrical about the fiber direction of the fourth unidirectional fibrous layer 34.

The second embodiment functions similar to the first embodiment. However, the second embodiment has additional unidirectional fibrous layers, including the seventh unidirectional fibrous layer 37, the eighth unidirectional fibrous layer 38, the ninth unidirectional fibrous layer 39, and the tenth unidirectional fibrous layer 30.

As an example, in the first embodiment (see FIG. 1) and the second embodiment (see FIG. 2), the unidirectional fibrous layers 32, 33, 35, 36 can be aligned at specific directions, wherein the fiber direction of the second unidirectional fibrous layer 32 is at an angle of 30 degrees to the fiber direction of the first unidirectional fibrous layer 31; the fiber direction of the third unidirectional fibrous layer 33 is at an angle of −30 degrees to the fiber direction of the first unidirectional fibrous layer 31; the fiber direction of the fifth unidirectional fibrous layer 35 is at an angle of 30 degrees to the fiber direction of the fourth unidirectional fibrous layer 34; the fiber direction of the sixth unidirectional fibrous layer 36 is at an angle of −30 degrees to the fiber direction of the fourth unidirectional fibrous layer 34.

As another example, in the first and second embodiments, the unidirectional fibrous layers 32, 33, 35 and 36 can be aligned at specific directions, wherein the fiber direction of the second unidirectional fibrous layer 32 is at an angle of 45 degrees to the fiber direction of the first unidirectional fibrous layer 31; the fiber direction of the third unidirectional fibrous layer 33 is at an angle of −45 degrees to the fiber direction of the first unidirectional fibrous layer 31; the fiber direction of the fifth unidirectional fibrous layer 35 is at an angle of 45 degrees to the fiber direction of the fourth unidirectional fibrous layer 34; the fiber direction of the sixth unidirectional fibrous layer 36 is at an angle of −45 degrees to the fiber direction of the fourth unidirectional fibrous layer 34.

As a further example, in the second embodiment (see FIG. 2), the unidirectional fibrous layers 32, 33, 35, 36, 37, 38, 39 and 30 can be aligned at specific directions, wherein the fiber direction of the second unidirectional fibrous layer 32 is at an angle of 30 degrees to the fiber direction of the first unidirectional fibrous layer 31; the fiber direction of the third unidirectional fibrous layer 33 is at an angle of −30 degrees to the fiber direction of the first unidirectional fibrous layer 31; the fiber direction of the fifth unidirectional fibrous layer 35 is at an angle of 30 degrees to the fiber direction of the fourth unidirectional fibrous layer 34; the fiber direction of the sixth unidirectional fibrous layer 36 is at an angle of −30 degrees to the fiber direction of the fourth unidirectional fibrous layer 34; the fiber direction of the seventh unidirectional fibrous layer 37 is at an angle of 45 degrees to the fiber direction of the first unidirectional fibrous layer 31; the fiber direction of the eighth unidirectional fibrous layer 38 is at an angle of −45 degrees to the fiber direction of the first unidirectional fibrous layer 31; the fiber direction of the ninth unidirectional fibrous layer 39 is at an angle of 45 degrees to the fiber direction of the fourth unidirectional fibrous layer 34; the fiber direction of the tenth unidirectional fibrous layer 30 is at an angle of −45 degrees to the fiber direction of the fourth unidirectional fibrous layer 34.

Figure 3:
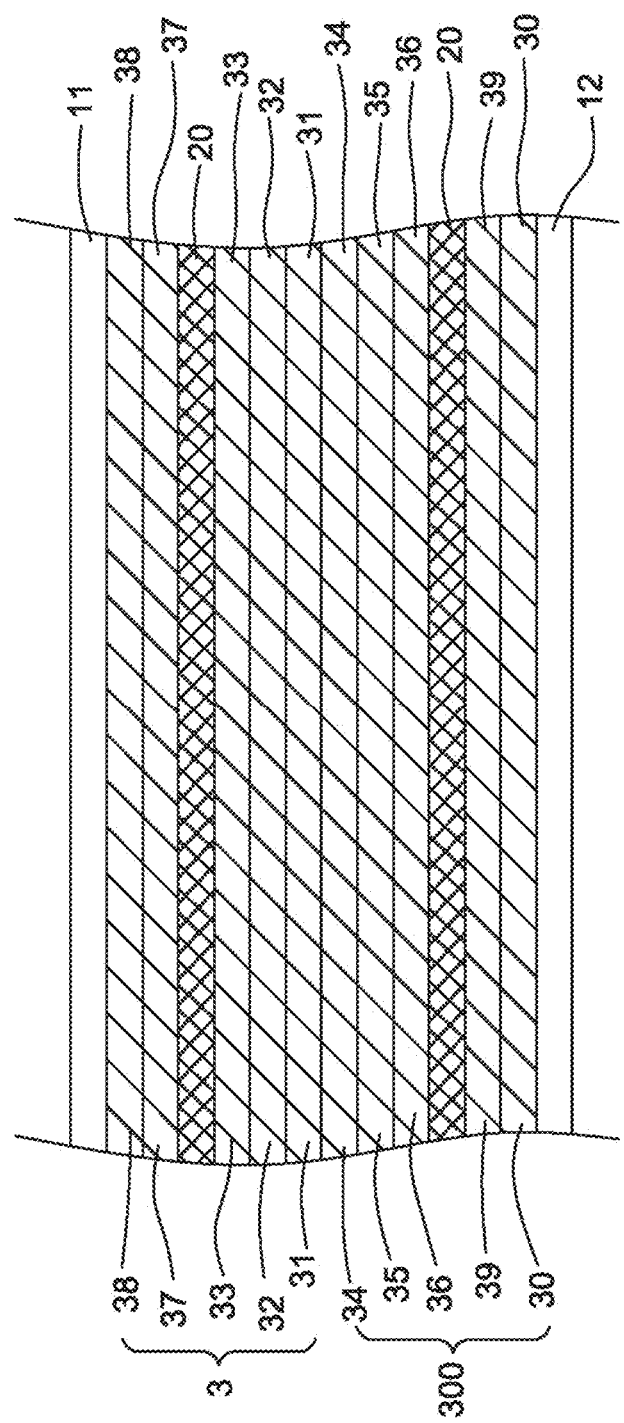
FIG. 3 shows a schematic sectional view of a composite laminate according to a third embodiment of the present invention.

Referring to FIG. 3, a composite laminate according to a third embodiment of the present invention is shown, which functions similar to the previous embodiments, wherein two metal meshes 20 are employed. The upper metal mesh 20 is disposed between the third unidirectional fibrous layer 33 and the seventh unidirectional fibrous layer 37 of the upper stack 3, whereas the lower metal mesh 20 is disposed between the sixth unidirectional fibrous layer 36 and the ninth unidirectional fibrous layer 39 of the lower stack 300. By adding additional metal sheets to the composite laminate, the strength and the impact resisting capacity of the composite laminate can be further increased.

For increasing the bonding between the metal mesh 20 and its adjacent fibrous layers, the size of the metal mesh 20 has to match the diameter of the fibers of the adjacent fibrous layers. Preferably, the size of the metal mesh 20 is between 80 and 500 of ASTM standard.

Preferably, the metal mesh 20 is coated with a primer or priming agent for conditioning the surface to improve the bonding between the metal mesh and the adhesive resin, so that the metal mesh 20 can be effectively bonded to the adjacent fibrous layers. For conditioning a stainless steel mesh, the primers including a phosphate monomer (10-methacryloyloxydecyl dihydrogen phosphate; MDP), such as Alloy Primer and Estenia Opaque Primer (both manufactured by Kuraray Medical Inc.) can be used.

The metal mesh 20 can be a woven or knitted product of metal threads. The material of the metal threads can be selected from the group consisting of stainless steel, alloy steel, aluminum alloy, titanium alloy and copper alloy.

The composite laminates of the present invention can be used to manufactures various parts of bicycles, such as front fork, frame, seat post, handlebar, rim, and crank shaft.

As described above, the first composite layer 11 and the second composite layer 12 can be formed by using glass fabrics, carbon fabrics, or mats, while the unidirectional fibrous layers can be formed by using unidirectional prepregs of carbon fibers.

The following paragraphs will describe four tests (Test 1, Test 2, Test 3 and Test 4) being conducted to show the effects of the composite laminates of the present invention.

Test 1 is concerned with an impact resistance test for a carbon fiber reinforced composite laminate without any metal meshes and a carbon fiber reinforced composite laminate with a metal mesh, both of which can be used to manufacture the steering tube of a bicycle. Specimens involved in this test are divided into two categories: category A and category B.

Category A is concerned with the specimens of a composite laminate without any metal meshes, which has a total thickness of 2.2 mm. The laminate is structured as: glass fabric/45 degrees fibrous layer/−45 degrees fibrous layer/30 degrees fibrous layer/−30 degrees fibrous layer/zero degree fibrous layer/zero degree fibrous layer/−30 degrees fibrous layer/30 degrees fibrous layer/−45 degrees fibrous layer/45 degrees fibrous layer/glass fabric, wherein the glass fabric is a plain weave fabric having a weight of 164 g/m2; each of the fibrous layers is a unidirectional carbon fiber prepreg having a weight of 150 g/m2 and being aligned at a direction as specified, wherein two of the fibrous layers are aligned at a direction of zero degree. Each specimen of Category A has a dimension of 12.7 mm (width)*63.5 mm (length).

Category B is concerned with the specimens of a composite laminate with a metal mesh, which has a total thickness of 2.2 mm. The laminate is structured as: glass fabric/45 degrees fibrous layer/−45 degrees fibrous layer/30 degrees fibrous layer/−30 degrees fibrous layer/zero degree fibrous layer/metal mesh/zero degree fibrous layer/−30 degrees fibrous layer/30 degrees fibrous layer/−45 degrees fibrous layer/45 degrees fibrous layer/glass fabric, wherein the glass fabric and the fibrous layers are same as the counterparts of the specimens of Category A; the metal mesh, being made of stainless steel, is of 150-size according to ASTM standard. Each specimen of Category B has a dimension of 12.7 mm (width)*63.5 mm (length).

The impact resistance test is performed by a testing machine according to ASTM D256 Izod method.

The results of Test 1 are listed in the following table:

| Category | Specimen ID | Impact Strength (kg-cm/cm2) | Average (Kg-cm/cm2) |
| --- | --- | --- | --- |
| A | A-1 | 83.7 | 81.0 |
|  | A-2 | 86.1 |  |
|  | A-3 | 74.3 |  |
|  | A-4 | 77.6 |  |
|  | A-5 | 83.4 |  |
| B | B-1 | 115.3 | 100.7 |
|  | B-2 | 107.7 |  |
|  | B-3 | 90.0 |  |
|  | B-4 | 94.7 |  |
|  | B-5 | 95.6 |  |

The above test results shows that the impact resistance of the specimens of a composite laminate being added with a stainless steel mesh is increased by 25% when compared with the impact resistance of the specimens of a composite laminate without any metal meshes.

Test 2 is concerned with an impact resistance test for a steering tube formed of a carbon fiber reinforced composite laminate without any metal meshes, a steering tube formed of a carbon fiber reinforced composite laminate with a metal mesh, and a steering tube formed of a carbon fiber reinforced composite laminate with two metal meshes. Specimens involved in this test are divided into threes categories: category A, category B, and category C.

Category A of this test is concerned with the specimens of a steering tube formed of a carbon fiber reinforced composite laminate without any metal meshes, wherein the composite laminate is structured the same as the specimens of Category A of Test 1.

Category B of this test is concerned with the specimens of a steering tube formed of a carbon fiber reinforced composite laminate with a 150-size, stainless steel mesh, wherein the composite laminate is structured the same as the specimens of Category B of Test 1.

Category C of this test is concerned with the specimens of a steering tube formed of a carbon fiber reinforced composite laminate with two 150-size, stainless steel meshes, wherein one stainless steel mesh is disposed at ⅓ of the thickness of the composite laminate, while the other stainless steel mesh is disposed at ⅔ of the thickness of the composite laminate.

The specimens (i.e., the steering tubes) of the above categories of this test are formed by a conventional blow-molding process under pressure of 12 kg/cm2 and temperature of 145 degrees C.

Figure 4:
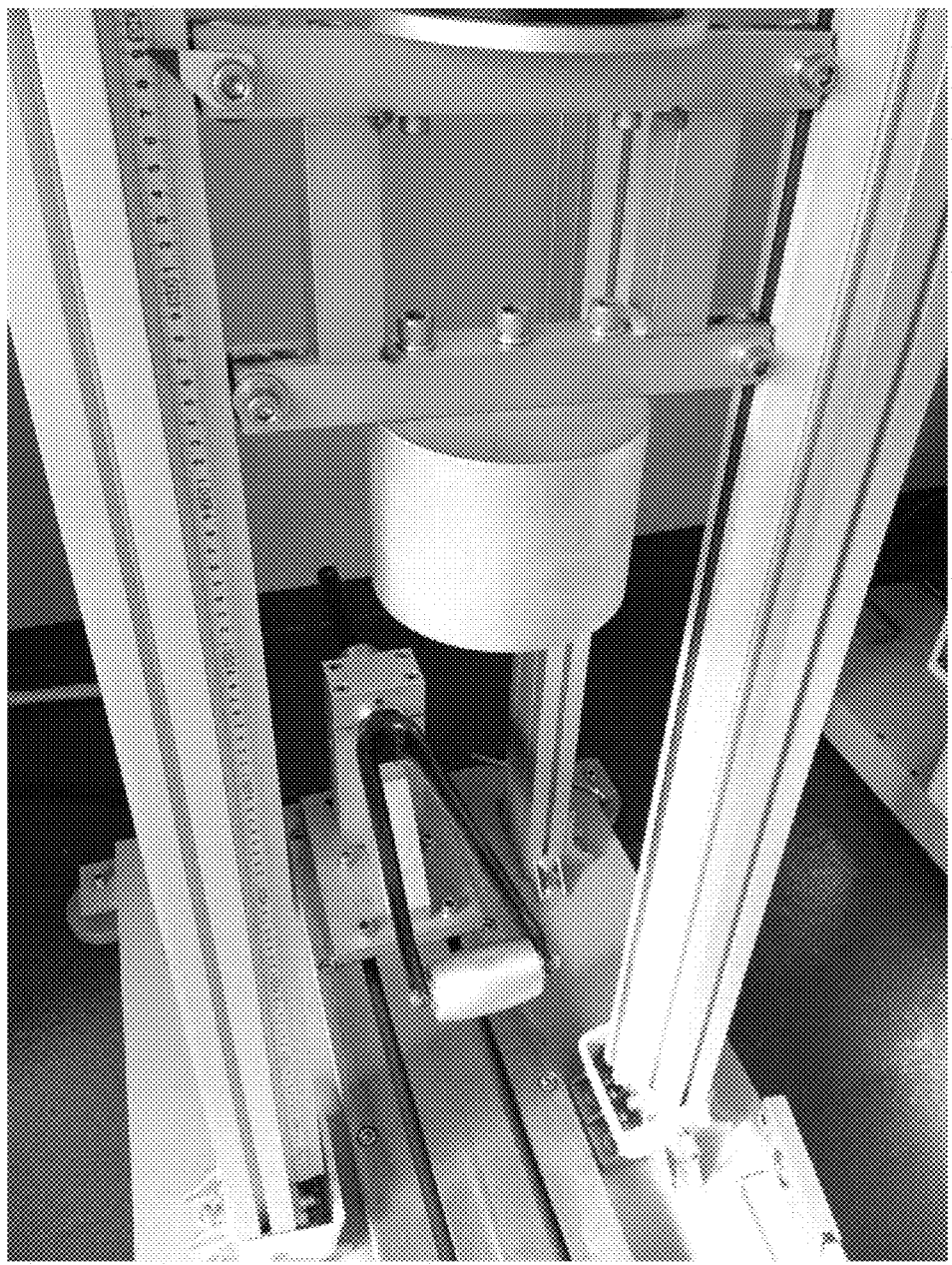
FIG. 4 shows a photograph of a testing machine for performing an impact resistance test (Test 2), wherein a specimen of a steering tube together with a front fork is rigidly mounted.

The impact resistance test is performed by a testing machine according to the rearward impact test of EN 14781 4.9.5 standard, wherein the hammer of the testing machine has a weight of 22.5 kg and is arranged at a height of 640 mm; a specimen (steering tube together with a front fork) to be tested is rigidly mounted on the machine (see FIG. 4).

Figure 5A:
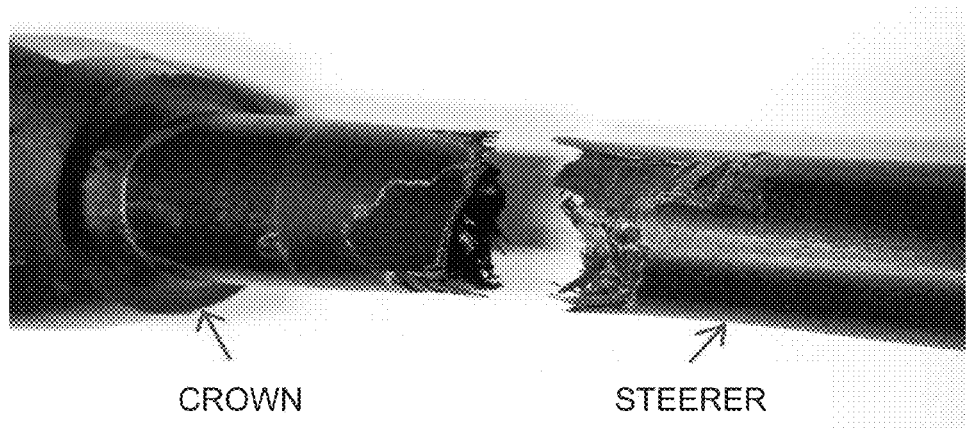
FIG. 5a shows a photograph of a tested steering tube formed of a carbon fiber reinforced composite laminate without any metal meshes (Test 2).

FIG. 5a shows a photograph of a tested steering tube of Category A (without any metal meshes), wherein the steering tube is fractured at the portion about 6 to 8 cm from the crown of the front fork. When such a fracture occurs at the steering tube of a bicycle, it is quite likely that the rider will have a fatal risk.

Figure 5B:
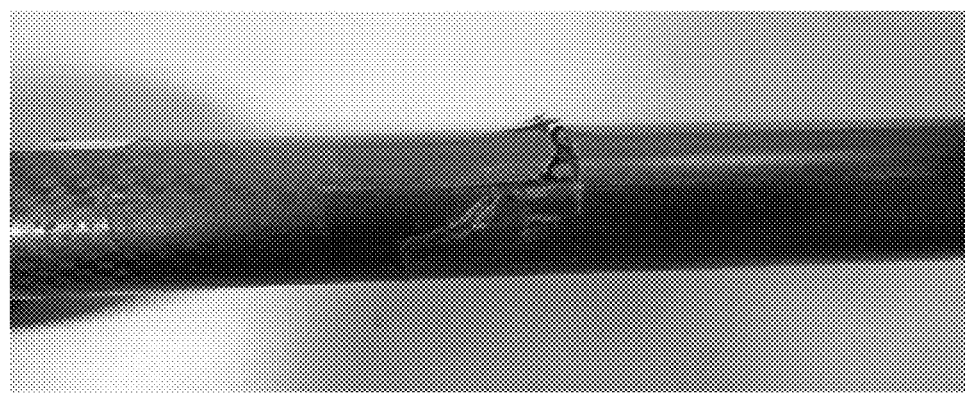
FIG. 5b shows a photograph of a tested steering tube formed of a carbon fiber reinforced composite laminate with a stainless steel mesh (Test 2).

FIG. 5b shows a photograph of a tested steering tube of Category B (with a 150-size, 3.5 g, stainless steel mesh added to the steering tube at the portion about 5 to 15 cm from the crown of the front fork), wherein the steering tube is not fractured into two separate pieces, but only a surface crack is produced at the portion about 8 cm from the crown. Obviously, the use of a metal mesh into a composite laminate can prevent a catastrophic breakage of the composite laminate, thus ensuring safety for users.

Figure 5C:
FIG. 5c shows a photograph of a tested steering tube formed of a carbon fiber reinforced composite laminate with two stainless steel meshes (Test 2).

FIG. 5c shows a photograph of a tested steering tube of Category C (with two 150-size, 3.5 g, stainless steel meshes added to the steering tube), wherein only a small impression is produced at the portion about 8 cm from the crown of the front fork. Obviously, the use of two metal meshes into a composite laminate can further increase the safety.

The above test results show that the addition of one metal mesh (total weight 3.5 g) or two metal meshes (total weight 7 g) into a composite laminate, which occupies only 1% or 2% of a front fork (about 360 g), can significantly improve the impact strength, and this demonstrates the advantages of the composite laminates of the present invention.

Test 3 is concerned with a tensile strength test for a steering tube formed of a carbon fiber reinforced composite laminate without any metal meshes, a steering tube formed of a carbon fiber reinforced composite laminate with a metal mesh being not coated with a primer, and a steering tube formed of a carbon fiber reinforced composite laminate with a metal mesh being coated with a primer. Specimens involved in this test are divided into threes categories: category A, category B, and category C.

Category A of this test is concerned with the specimens of a carbon fiber reinforced composite laminate without any metal meshes, which is structured the same as the specimens of Category A of Test 1.

Category B of this test is concerned with the specimens of a carbon fiber reinforced composite laminate with a 150-size, stainless steel mesh being not coated with a primer, which is structured the same as the specimens of Category B of Test 1.

Category C of this test is concerned with the specimens of a carbon fiber reinforced composite laminate with a 150-size, stainless steel mesh being coated with a primer, which is structured the same as the specimens of Category B of Test 1.

The tensile strength test is performed by a testing machine according to ASTM D3039 standard.

The results of Test 3 are listed in the following table:

| Category | Specimen ID | Tensile Strength (MPa) | Average (MPa) |
| --- | --- | --- | --- |
| A | A-1 | 476 | 464 |
|   | A-2 | 482 |   |
|   | A-3 | 473 |   |
|   | A-4 | 458 |   |
|   | A-5 | 431 |   |
| B | B-1 | 482 | 482 |
|   | B-2 | 520 |   |
|   | B-3 | 482 |   |
|   | B-4 | 433 |   |
|   | B-5 | 491 |   |
| C | C-1 | 701 | 676 |
|   | C-2 | 728 |   |
|   | C-3 | 645 |   |
|   | C-4 | 627 |   |
|   | C-5 | 678 |   |

The above test results show that the tensile strength of the specimens of Category B (with a stainless steel mesh without a primer) is increased by 4% when compared with the tensile strength of the specimens of Category A (without any metal meshes); the tensile strength of the specimens of Category C (with a stainless steel mesh being coated with a primer) is increased by 45% when compared with the tensile strength of the specimens of Category A (without any metal meshes). The reason is that the adhesive resin used in the composite laminates cannot effectively bond the stainless mesh to the adjacent fibrous layers. The primer used in the specimens of Category C can help the stainless steel mesh be bonded to the adjacent fibrous layers.

Test 4 is concerned with a compression test for a steering tube formed of a carbon reinforced composite laminate without any metal meshes, a steering tube formed of a carbon reinforced composite laminate with a metal sheet near an outer surface of the laminate, and a steering tube formed of a carbon reinforced composite laminate with a metal sheet near an inner surface of the laminate. Specimens involved in this test are divided into three categories: Category I, Category II, and Category III.

Category I is concerned with the specimens of a steering tube of a carbon fiber reinforced composite laminate without any metal meshes.

Category II is concerned with the specimens of a steering tube of a carbon fiber reinforced composite laminate with a metal mesh, wherein the metal mesh is disposed in the composite laminate, near its outer surface.

Category III is concerned with the specimens of a steering tube of a carbon fiber reinforced composite laminate with a metal mesh, wherein the metal mesh is disposed in the composite laminate, near its inner surface.

Figure 6A:
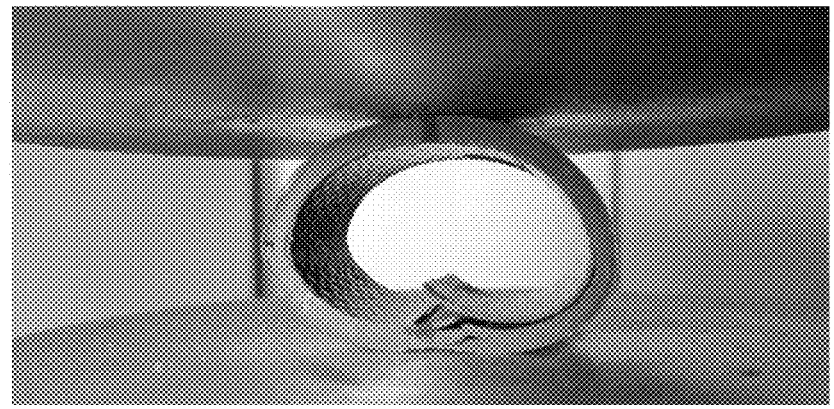
FIG. 6a shows a photograph of a tested steering tube formed of a carbon fiber reinforced composite laminate without any metal meshes (Test 4).

FIG. 6a shows a photograph of a tested steering tube of Category I (without any metal meshes).

Figure 6B:
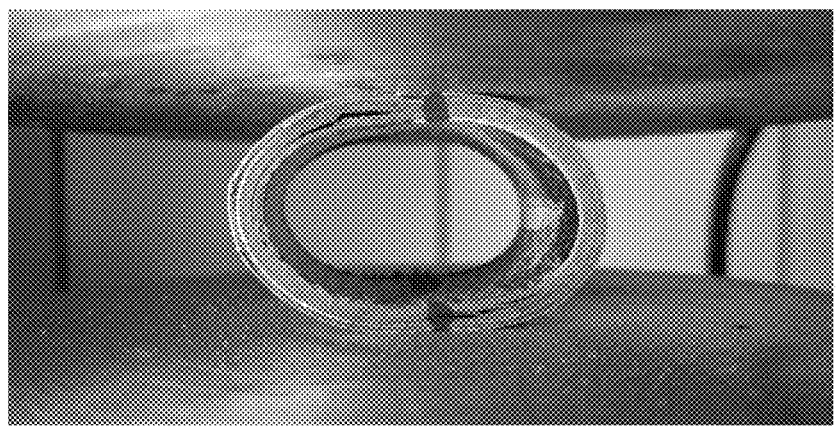
FIG. 6b shows a photograph of a tested steering tube formed of a carbon fiber reinforced composite laminate with a metal mesh disposed near the outer surface of the tube (Test 4).

FIG. 6b shows a photograph of a tested steering tube of Category II (with a metal mesh near the outer surface of the steering tube).

Figure 6C:
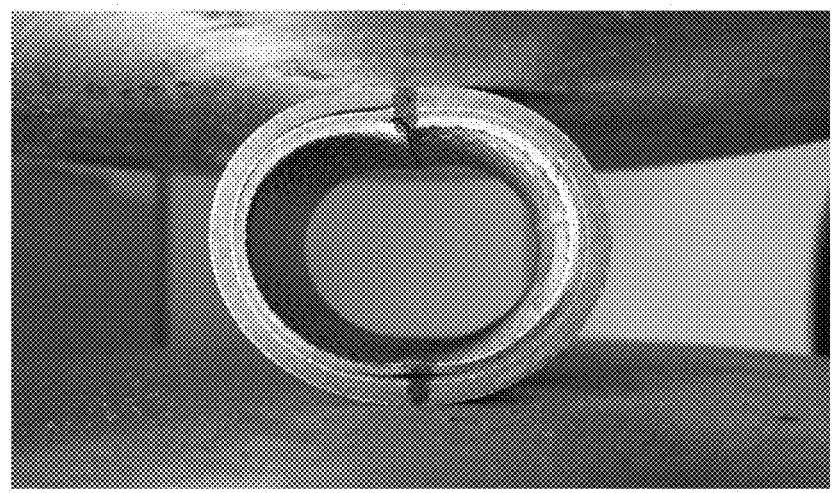
FIG. 6c shows a photograph of a tested steering tube formed of a carbon fiber reinforced composite laminate with a metal mesh disposed near the inner surface of the tube (Test 4).

FIG. 6c shows a photograph of a tested steering tube of Category III (with a metal mesh near the inner surface of the steering tube).

The crushing load and the stiffness of the steering tubes are listed in the following table:

| Category | Specimen ID | Crushing Load (kg) | Stiffness (kg/mm) |
| --- | --- | --- | --- |
| I | I-1 | 157.1 | 44.4 |
|   | I-2 | 202.9 | 52.4 |
|   | I-3 | 159.1 | 49.1 |

-continued

| Category | Specimen ID | Crushing Load (kg) | Stiffness (kg/mm) |
|---|---|---|---|
| | I-4 | 200.3 | 49.7 |
| | Average | 179.9 | 48.9 |
| II | II-1 | 223.5 | 105.4 |
| | II-2 | 221.1 | 66.3 |
| | II-3 | 182.4 | 100.7 |
| | Average | 209.0 | 90.8 |
| III | III-1 | 301.8 | 104.4 |
| | III-2 | 275.5 | 95.3 |
| | III-3 | 291.5 | 114.3 |
| | Average | 289.6 | 104.7 |

From the above test results, it is proved that a metal mesh added to a composite laminate allows the compression resistance of a steering tube formed of the composite laminate to be increased. Furthermore, a steering tube formed of a composite laminate being added with a metal mesh near its inner surface will have a best compression resistance, which is almost double of the compression resistance of a steering tube formed of a composite laminate without any metal meshes.

In view of the foregoing, it is clear that the present invention has the following features and advantages:

1. By adding a metal sheet to a composite laminate, the strength and impact resisting capacity can be increased, and a failure of a part formed of the composite laminate can be warned at an earlier time, so that the part can be prevented from catastrophic damages due to brittle fracture.

2. A metal mesh being coated with a primer can improve the bonding between the metal mesh and its adjacent fibrous layers.

3. The pliability of a metal mesh allows a composite laminate incorporating the metal mesh to be formed into a desired shape for making a part.

The above embodiments are used merely for illustrating the features and advantages of the present invention, but not intended for limiting the scope of the present invention. It is understood that those skilled in the art can make various modifications for the embodiments. The scope of the present invention should be interpreted by the claims hereinafter appended.

We claim:

1. A composite laminate comprising:
a first composite layer;
a second composite layer;
a metal mesh;
an upper stack of multiple unidirectional fibrous layers;
a lower stack of multiple unidirectional fibrous layers;
the metal mesh being disposed between the upper stack of unidirectional fibrous layers and the lower stack of unidirectional fibrous layers;
the first composite layer being disposed on an outer surface of the upper stack distal from the metal mesh;
the second composite layer being disposed on an outer surface of the lower stack distal from the metal mesh;
an adhesive resin;
a bonding between two adjacent layers of the composite laminate being achieved by the adhesive resin;
a primer; and
the metal mesh being coated with the primer to improve the bonding between the metal mesh and the adhesive resin and further its adjacent unidirectional fibrous layers.

2. The composite laminate of claim 1 further comprising:
the size of the metal mesh being between 80 and 500 of ASTM standard.

3. The composite laminate of claim 1 further comprising:
the upper stack comprising a first unidirectional fibrous layer, a second unidirectional fibrous layer, and a third unidirectional layer;
the lower stack comprising a fourth unidirectional fibrous layer, a fifth unidirectional fibrous layer, and a sixth unidirectional layer;
the first composite layer being bonded to the third unidirectional fibrous layer which is in turn bonded to the second unidirectional fibrous layer which is in turn bonded to the first unidirectional fibrous layer which is in turn bounded to a top surface of the metal mesh; and
the second composite layer being bonded to the sixth unidirectional fibrous layer which is in turn bonded to the fifth unidirectional fibrous layer which is in turn bonded to the fourth unidirectional fibrous layer which is in turn bonded to a bottom surface of the metal mesh.

4. The composite laminate of claim 3 further comprising:
the fibers of the second unidirectional fibrous layer and the fibers of the third unidirectional fibrous layer being aligned at different directions such that the fiber direction of the second unidirectional fibrous layer and the fiber direction of the third unidirectional fibrous layer are symmetrical about the fiber direction of the first unidirectional fibrous layer.

5. The composite laminate of claim 3 further comprising:
the fibers of the fifth unidirectional fibrous layer and the fibers of the sixth unidirectional fibrous layer being aligned at different directions such that the fiber direction of the fifth unidirectional fibrous layer and the fiber direction of the sixth unidirectional fibrous layer are symmetrical about the fiber direction of the fourth unidirectional fibrous layer.

6. The composite laminate of claim 3 further comprising:
the fibers of the first unidirectional fibrous layer and the fibers of the fourth unidirectional fibrous layer being aligned at the same direction;
the fibers of the second unidirectional fibrous layer and the fibers of the third unidirectional fibrous layer being aligned at different directions such that the fiber direction of the second unidirectional fibrous layer and the fiber direction of the third unidirectional fibrous layer are symmetrical about the fiber direction of the first unidirectional fibrous layer; and
the fibers of the fifth unidirectional fibrous layer and the fibers of the sixth unidirectional fibrous layer being aligned at different directions such that the fiber direction of the fifth unidirectional fibrous layer and the fiber direction of the sixth unidirectional fibrous layer are symmetrical about the fiber direction of the fourth unidirectional fibrous layer.

7. The composite laminate of claim 6 further comprising:
the fiber direction of the second unidirectional fibrous layer being at an angle of 30 degrees to the fiber direction of the first unidirectional fibrous layer;
the fiber direction of the third unidirectional fibrous layer being at an angle of −30 degrees to the fiber direction of the first unidirectional fibrous layer;
the fiber direction of the fifth unidirectional fibrous layer being at an angle of 30 degrees to the fiber direction of the fourth unidirectional fibrous layer; and
the fiber direction of the sixth unidirectional fibrous layer being at an angle of −30 degrees to the fiber direction of the fourth unidirectional fibrous layer.

8. The composite laminate of claim 6 further comprising:
the fiber direction of the second unidirectional fibrous layer being at an angle of 45 degrees to the fiber direction of the first unidirectional fibrous layer;
the fiber direction of the third unidirectional fibrous layer being at an angle of −45 degrees to the fiber direction of the first unidirectional fibrous layer;
the fiber direction of the fifth unidirectional fibrous layer being at an angle of 45 degrees to the fiber direction of the fourth unidirectional fibrous layer; and
the fiber direction of the sixth unidirectional fibrous layer being at an angle of −45 degrees to the fiber direction of the fourth unidirectional fibrous layer.

9. The composite laminate of claim 1 further comprising:
the upper stack comprising a first unidirectional fibrous layer, a second unidirectional fibrous layer, a third unidirectional layer, a seventh unidirectional fibrous layer, and an eighth unidirectional fibrous layer;
the lower stack comprising a fourth unidirectional fibrous layer, a fifth unidirectional fibrous layer, a sixth unidirectional layer, a ninth unidirectional fibrous layer, and a tenth unidirectional fibrous layer;
the first composite layer being bonded to the eighth unidirectional fibrous layer which is in turn bonded to the seventh unidirectional fibrous layer which is in turn bonded to the third unidirectional fibrous layer which is in turn bonded to the second unidirectional fibrous layer which is in turn bonded to the first unidirectional fibrous layer which is in turn bonded to a top surface of the metal sheet;
the second composite layer being bonded to the tenth unidirectional fibrous layer which is in turn bonded to the ninth unidirectional fibrous layer which is in turn bonded to the sixth unidirectional fibrous layer which is in turn bonded to the fifth unidirectional fibrous layer which is in turn bonded to the fourth unidirectional fibrous layer which is in turn bonded to a bottom surface of the metal sheet;
the fibers of the first unidirectional fibrous layer and the fibers of the fourth unidirectional fibrous layer being aligned at the same direction;
the fibers of the second unidirectional fibrous layer and the fibers of the third unidirectional fibrous layer being aligned at different directions such that the fiber direction of the second unidirectional fibrous layer and the fiber direction of the third unidirectional fibrous layer are symmetrical about the fiber direction of the first unidirectional fibrous layer;
the fibers of the fifth unidirectional fibrous layer and the fibers of the sixth unidirectional fibrous layer being aligned at different directions such that the fiber direction of the fifth unidirectional fibrous layer and the fiber direction of the sixth unidirectional fibrous layer are symmetrical about the fiber direction of the fourth unidirectional fibrous layer;
the fibers of the seventh unidirectional fibrous layer and the fibers of the eighth unidirectional fibrous layer being aligned at different directions such that the fiber direction of the seven unidirectional fibrous layer and the fiber direction of the eighth unidirectional fibrous layer are symmetrical about the fiber direction of the firth unidirectional fibrous layer; and
the fibers of the ninth unidirectional fibrous layer and the fibers of the tenth unidirectional fibrous layer being aligned at different directions such that the fiber direction of the ninth unidirectional fibrous layer and the fiber direction of the tenth unidirectional fibrous layer are symmetrical about the fiber direction of the fourth unidirectional fibrous layer.

10. The composite laminate of claim 9 further comprising:
the fiber direction of the second unidirectional fibrous layer being at an angle of 30 degrees to the fiber direction of the first unidirectional fibrous layer;
the fiber direction of the third unidirectional fibrous layer being at an angle of −30 degrees to the fiber direction of the first unidirectional fibrous layer;
the fiber direction of the fifth unidirectional fibrous layer being at an angle of 30 degrees to the fiber direction of the fourth unidirectional fibrous layer;
the fiber direction of the sixth unidirectional fibrous layer being at an angle of −30 degrees to the fiber direction of the fourth unidirectional fibrous layer;
the fiber direction of the seventh unidirectional fibrous layer being at an angle of 45 degrees to the fiber direction of the first unidirectional fibrous layer;
the fiber direction of the eighth unidirectional fibrous layer being at an angle of −45 degrees to the fiber direction of the first unidirectional fibrous layer;
the fiber direction of the ninth unidirectional fibrous layer being at an angle of 45 degrees to the fiber direction of the fourth unidirectional fibrous layer; and
the fiber direction of the tenth unidirectional fibrous layer being at an angle of −45 degrees to the fiber direction of the fourth unidirectional fibrous layer.

11. The composite laminate of claim 1 further comprising:
the first and second composite layers being formed of glass fabrics, carbon fabrics, or mats; and
the unidirectional fibrous layers being formed of unidirectional prepregs of carbon fibers.

12. A composite laminate comprising:
a first composite layer;
a second composite layer;
a first metal mesh;
a second metal mesh;
an upper stack of multiple unidirectional fibrous layers;
a lower stack of multiple unidirectional fibrous layers;
the upper and lower stacks being disposed between the first and second composite layers;
the first and second metal meshes being respectively disposed in the upper and lower stacks;
an adhesive resin;
a bonding between two adjacent layers of the composite laminate being achieved by the adhesive resin;
a primer; and
each of the first and second metal meshes being coated with the primer to improve the bonding between each of the first and second metal meshes and the adhesive resin and further its adjacent unidirectional fibrous layers.

13. The composite laminate of claim 12 further comprising:
the upper stack comprising a first unidirectional fibrous layer, a second unidirectional fibrous layer, a third unidirectional layer, a seventh unidirectional fibrous layer, and an eighth unidirectional fibrous layer;
the lower stack comprising a fourth unidirectional fibrous layer, a fifth unidirectional fibrous layer, a sixth unidirectional layer, a ninth unidirectional fibrous layer, and a tenth unidirectional fibrous layer;
the first composite layer being bonded to the eighth unidirectional fibrous layer which is in turn bonded to the seventh unidirectional fibrous layer which is in turn bonded to the first metal mesh which is in turn bonded to the third unidirectional fibrous layer which is in turn bonded to the second unidirectional fibrous layer which is in turn bonded to the first unidirectional fibrous layer;

the second composite layer being bonded to the tenth unidirectional fibrous layer which is in turn bonded to the ninth unidirectional fibrous layer which is in turn bonded to the second metal mesh which is in turn bonded to the sixth unidirectional fibrous layer which is in turn bonded to the fifth unidirectional fibrous layer which is in turn bonded to the fourth unidirectional fibrous layer;

the fibers of the first unidirectional fibrous layer and the fibers of the fourth unidirectional fibrous layer being aligned at the same direction;

the fibers of the second unidirectional fibrous layer and the fibers of the third unidirectional fibrous layer being aligned at different directions such that the fiber direction of the second unidirectional fibrous layer and the fiber direction of the third unidirectional fibrous layer are symmetrical about the fiber direction of the first unidirectional fibrous layer;

the fibers of the fifth unidirectional fibrous layer and the fibers of the sixth unidirectional fibrous layer being aligned at different directions such that the fiber direction of the fifth unidirectional fibrous layer and the fiber direction of the sixth unidirectional fibrous layer are symmetrical about the fiber direction of the fourth unidirectional fibrous layer;

the fibers of the seventh unidirectional fibrous layer and the fibers of the eighth unidirectional fibrous layer being aligned at different directions such that the fiber direction of the seven unidirectional fibrous layer and the fiber direction of the eighth unidirectional fibrous layer are symmetrical about the fiber direction of the first unidirectional fibrous layer; and the fibers of the ninth unidirectional fibrous layer and the fibers of the tenth unidirectional fibrous layer being aligned at different directions such that the fiber direction of the ninth unidirectional fibrous layer and the fiber direction of the tenth unidirectional fibrous layer are symmetrical about the fiber direction of the fourth unidirectional fibrous layer.

14. The composite laminate of claim 12 further comprising:

the size of each of the first and second metal meshes being between 80 and 500 of ASTM standard.

15. The composite laminate of claim 12 further comprising:

the fiber direction of the second unidirectional fibrous layer being at an angle of 30 degrees to the fiber direction of the first unidirectional fibrous layer;

the fiber direction of the third unidirectional fibrous layer being at an angle of −30 degrees to the fiber direction of the first unidirectional fibrous layer;

the fiber direction of the fifth unidirectional fibrous layer being at an angle of 30 degrees to the fiber direction of the fourth unidirectional fibrous layer; and the fiber direction of the sixth unidirectional fibrous layer being at an angle of −30 degrees to the fiber direction of the fourth unidirectional fibrous layer.

16. The composite laminate of claim 12 further comprising:

the fiber direction of the second unidirectional fibrous layer being at an angle of 45 degrees to the fiber direction of the first unidirectional fibrous layer;

the fiber direction of the third unidirectional fibrous layer being at an angle of −45 degrees to the fiber direction of the first unidirectional fibrous layer;

the fiber direction of the fifth unidirectional fibrous layer being at an angle of 45 degrees to the fiber direction of the fourth unidirectional fibrous layer; and the fiber direction of the sixth unidirectional fibrous layer being at an angle of −45 degrees to the fiber direction of the fourth unidirectional fibrous layer.

17. The composite laminate of claim 12 further comprising:

the fiber direction of the second unidirectional fibrous layer being at an angle of 30 degrees to the fiber direction of the first unidirectional fibrous layer;

the fiber direction of the third unidirectional fibrous layer being at an angle of −30 degrees to the fiber direction of the first unidirectional fibrous layer;

the fiber direction of the fifth unidirectional fibrous layer being at an angle of 30 degrees to the fiber direction of the fourth unidirectional fibrous layer;

the fiber direction of the sixth unidirectional fibrous layer being at an angle of −30 degrees to the fiber direction of the fourth unidirectional fibrous layer;

the fiber direction of the seventh unidirectional fibrous layer being at an angle of 45 degrees to the fiber direction of the first unidirectional fibrous layer;

the fiber direction of the eighth unidirectional fibrous layer being at an angle of −45 degrees to the fiber direction of the first unidirectional fibrous layer;

the fiber direction of the ninth unidirectional fibrous layer being at an angle of 45 degrees to the fiber direction of the fourth unidirectional fibrous layer; and the fiber direction of the tenth unidirectional fibrous layer being at an angle of −45 degrees to the fiber direction of the fourth unidirectional fibrous layer.

18. The composite laminate of claim 12 further comprising:

the first and second composite layers being formed of glass fabrics, carbon fabrics, or mats; and the unidirectional fibrous layers being formed of unidirectional prepregs of carbon fibers.

* * * * *